(No Model.) 2 Sheets—Sheet 1.

J. C. BUTLER.
WIND WHEEL.

No. 272,525. Patented Feb. 20, 1883.

Witnesses
P. B. Turpin
T. N. Griffin

Inventor
Joseph C. Butler
By R. S. & A. P. Lacey
Attys

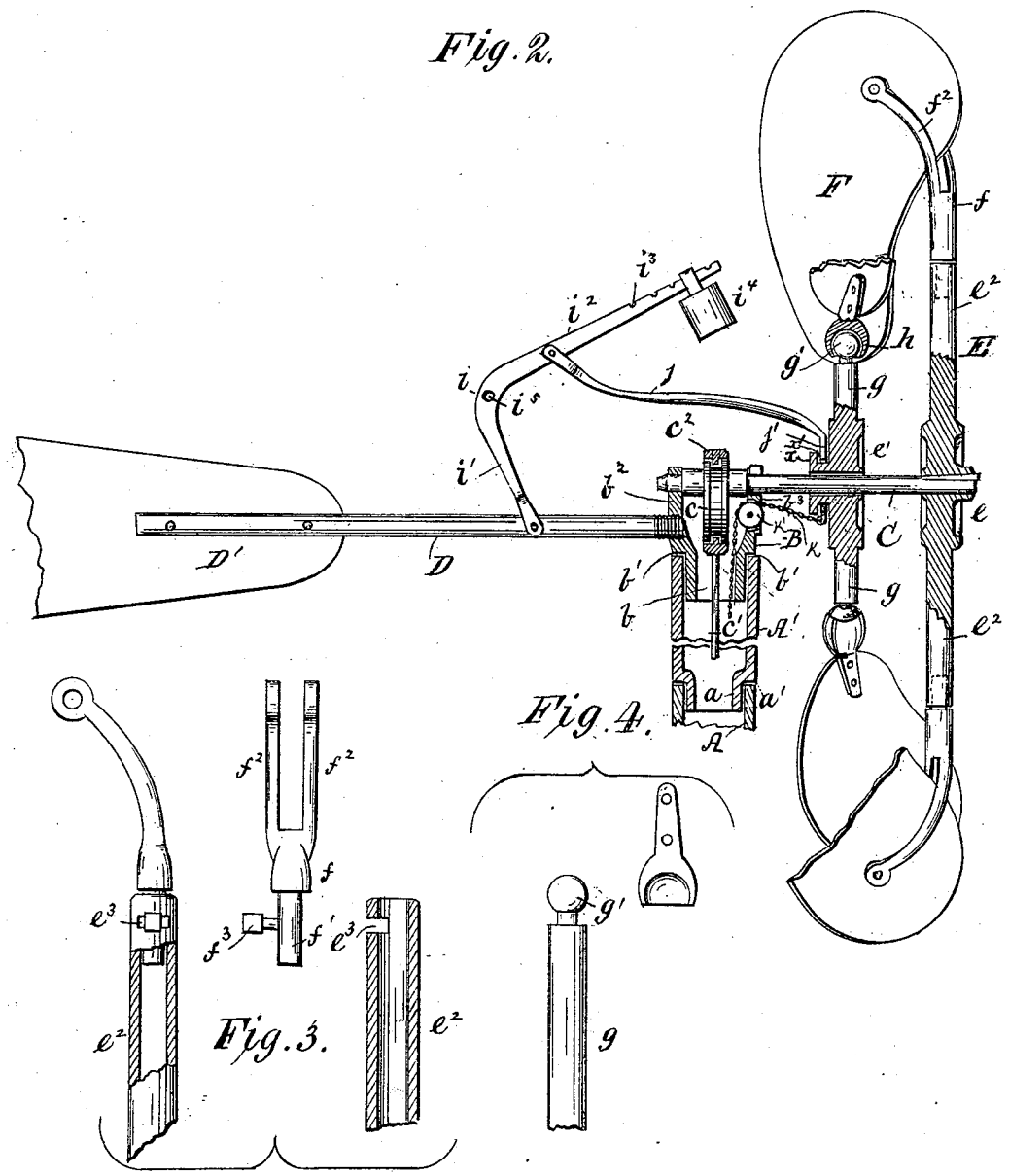

UNITED STATES PATENT OFFICE.

JOSEPH C. BUTLER, OF DE KALB, ILLINOIS.

WIND-WHEEL.

SPECIFICATION forming part of Letters Patent No. 272,525, dated February 20, 1883.

Application filed September 19, 1882. (No model.)

*To all whom it may concern:*

Be it known that I, JOSEPH C. BUTLER, a citizen of the United States, residing at De Kalb, in the county of De Kalb and State of Illinois, have invented certain new and useful Improvements in Wind-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in wind-wheels; and it consists in the construction, combination, and arrangement of the several parts, as will be hereinafter fully described, and specifically pointed out in the claims.

Figure 1:
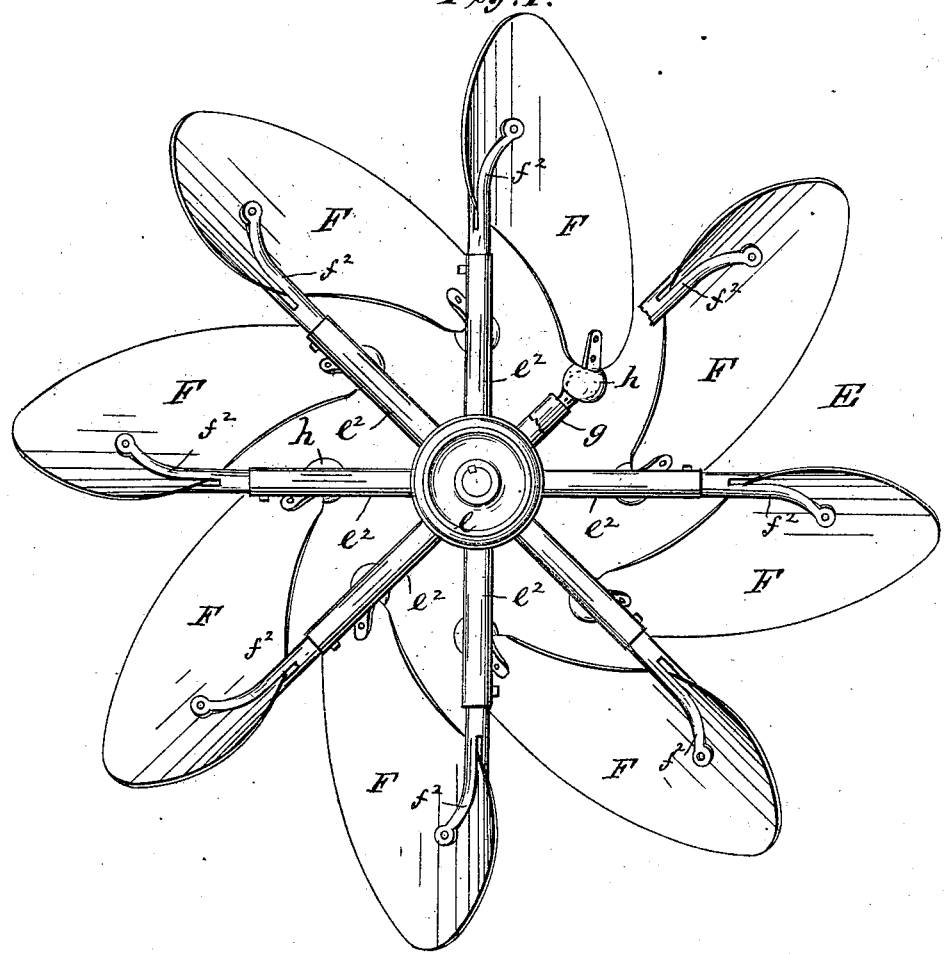
Figure 5:
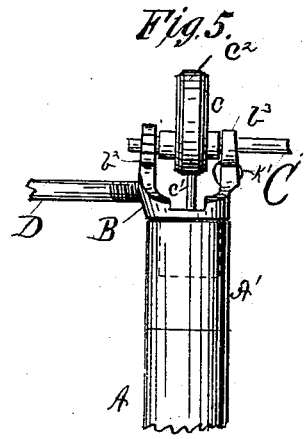

In the drawings, Figure 1 is a front view of my improved wheel. Fig. 2 is a vertical section of the same with the tower broken away. Figs. 3 and 4 are detail views; and Fig. 5 is a detached side view of the top of the tower, turn-table, eccentric, &c.

A represents the tower, hollow, as shown.

A' represents a socket-bearing and intermediate turn-table, the main portion of which is about same diameter as the tower, and it is provided with a depending tube, $a$, made of a diameter equal to the bore of the tower and smaller than the main portion, whereby there is provided the annular shoulder $a'$, which rests on the top of tower A, as shown.

B represents the turn-table. It is provided with the depending tube $b$, fitted into the socket A', and this tube is made smaller than the main portion of the table, leaving the annular bearing-surface $b'$, which rests down on the top of socket or intermediate turn-table, A', as shown.

$b^2 b^3$ are lugs or arms extended vertically upward from the opposite sides of the turn-table B, and provided with bearings for the shaft of the wheel, as will be described.

C represents the shaft. It is secured in a bearing in the lug $b^2$, and rests in the bearing or lug $b^3$, and extends forward, as shown.

$c$ represents a disk secured eccentrically on the shaft C, between the lugs $b^2 b^3$, and immediately over the openings through turn-table B and A' and tower A.

$c'$ represents the pump-rod working within the turn-tables and tower, and connected with disk $c$ by ring $c^2$, passed around the said disk, whereby reciprocating motion is given to the pump-rod in the operation of the machine, as will be understood on reference to the drawings.

D represents the vane-arm secured to the lug $b^2$, and extended rearward in a line with the wheel-shaft, as shown. It is provided with vane D', for keeping the wheel, hereinafter described, to the wind.

E represents the wheel having the hubs $e e'$. The hub $e$ is keyed on the outer end of the shaft C, and the hub $e'$ is sleeved loosely on the shaft in rear of the hub $e$, and between the latter and the turn-table B, as shown. The hub $e'$ is provided with an extension, $x$, projecting toward the turn-table B. It is provided with the annular groove $x'$, into which fits the jaws of the regulating-lever, hereinafter described.

$e^2$ represents hollow arms or spokes extended radially from the periphery of the hub $e$. The spokes are provided near their outer end with a transverse elongated slot, $e^3$, in which works the pin of the outer or supplementary arms, hereinafter described.

$f$ represents the supplementary arms. They are provided with the tang $f'$, which fits down in the outer end of spokes $e^2$, and their outer ends are bifurcated to provide the arms $f^2 f^2$, between which the sails or fans, hereinafter described, are pivoted.

$f^3$ represents a screw or pin which is passed through slot $e^3$ and into the tang $f'$, and secures the arm $f$ to the spokes $e^2$, and yet permits a limited rotating movement of the arm within the spoke in the operation of the invention.

$g$ represents spokes extended from the periphery of the hub $e'$. These spokes are made shorter than the spokes $e^2$, and they are provided on their outer ends with balls $g'$, which fit and work in the ball-socket provided on the inner lower end of the fans, hereinafter described.

F represents the fans or sails. They are made in outline almost pear shape, and are bent, as shown, so that they will be promptly acted on by the wind. The wider or forward end of the fans is pivoted between the arms $f^2 f^2$, and it is provided on its inner and rear end with a ball-socket, $h$, as shown, which receives the ball $g'$ on spokes $g$, as clearly shown in Fig. 2.

It will be understood that I do not desire to limit myself to the ball-and-socket joint, because a construction somewhat similar to that employed in the joint of the spokes and supplementary arms mounted on hub $e$ might be employed to permit the necessary motion of the parts in the movement of the hub $e'$ back toward the tower; but I prefer to use the ball-and-socket joint, as better results are accomplished thereby. By pivoting the sail at its extreme end to the spokes $g$ a prompter action is given to the fans when the hub $e'$ and spokes $g$ are forced back in the operation of the machine. It will also be understood that it is not necessary to bifurcate the outer end of the supplementary arms $f$, but that a single arm could be extended out and provide a suitable pivotal support for the fans; but I prefer the construction shown, for thereby I gain greater strength and a firmer connection.

$i$ represents an L-shaped bar, having one of its arms, $i'$, pivoted on the rod D, and its other arm, $i^2$, extended over the turn-table B, and provided on its upper edge with a series of notches, $i^3$, to permit the adjustment of the weight $i^4$ to regulate the pressure on the connecting-bar, hereinafter described. The arm $i^2$ is also provided with a series of holes, $i^5 i^5$, to permit the adjustment also of the connecting-bar.

$j$ represents the connecting-bar, having one of its ends secured to the arm $i^2$ of bar $i$ by a pin passed through the holes $i^5$, as shown. The other end is provided with a collar, $j'$, which extends around within the groove $x'$ and around the extension $x$ of hub $e'$, and connects the L-shaped bar and the hub, as shown. This arrangement brings the action of the fans directly upon the weight $i^4$. There are no intermediate joints between the arm $j$ and the lever $i$, so that no loss of power results, and a more exact and instantaneous action is had.

$k$ represents a chain secured to collar $j'$, and extended back over pulley $k'$, journaled in turn-table B', and down through the turn-tables and tower to the ground, and may be secured to an operating-lever, if so desired.

In the operation of my invention it will be seen that the action of the weighted lever $i$, through its connection-rod $j$, is to force the loose hub $e'$ out toward the outer hub, $e$, and hold the fans in the position shown with the greatest force of the wind. Should the wind be of a greater force than is required to do the necessary work, the fans will be forced back to a position more direct with the course of the wind. Consequently the pressure-surface will be diminished. The speed and working force of the wheel can be changed by moving the weight $i^4$ from one to the other of the notches $i^3$, as will be understood on reference to the drawings; and when it is desired to stop the engine, this may be accomplished by means of the chain or cord $k$, extending to the ground, as described.

Having thus described my invention, what I claim, and desire to secure by Letters Patent, is—

1. The windmill, substantially as described and shown, wherein the blades are arranged with their outer or forward ends pivoted to and partially rotating with the outer arm of the spokes extended from the fixed hub, and their inner or rear ends are extended rearward from the said spokes, and are secured by a universal joint to the outer end of the spokes extended from the adjustable hub, as and for the purposes specified.

2. The combination, substantially as set forth, of the hub $e$, the hollow spokes $e^2$, provided with transverse slots $e^3$ near their outer ends, and the arms $f$, provided with tang $f'$, seated in the spoke $e^2$, and secured by the pin or screw $f^3$, extending through and working on the slot $e^3$, and pivoted to the fan F, substantially as described.

3. The combination of the fan F, provided with ball-socket $h$ on its rear end, the spoke $g$, provided with ball $g'$, secured within the socket $h$, and the spoke $e^2 f$, extended from hub $e$, and pivoted to the forward part of the fan, substantially as set forth.

4. The spoke for wind-wheels, consisting of the inner tubular portion, $e^2$, provided with the transverse slot $e^3$, the outer portion, $f$, having the tang $f'$, constructed to enter the end of portion $e^2$, and the pin $f^3$, passed through slot $e^3$ and into a suitable hole in the tang $f'$, all arranged substantially as and for the purposes set forth.

5. The combination, with the vane-rod D, the shaft C, and adjustable hub $e'$, of the L-shaped lever $i$, having its arm $i'$ pivoted to the vane-rod and extended upward therefrom, and its arm $i^2$ carried forward toward the blades and provided with the weight $i^4$ on its upper forward end, and the connecting-rod $j$, having one end pivoted to the under side of the lever $i$, between the weight and the pivotal point, and its opposite end rested in a bearing on the sliding hub, substantially as and for the purposes set forth.

In testimony whereof I affix my signature in presence of two witnesses.

JOSEPH C. BUTLER.

Witnesses:
 I. V. RANDALL,
 A. W. JAY.